US012698122B2

(12) United States Patent
Liu et al.

(10) Patent No.: US 12,698,122 B2
(45) Date of Patent: Aug. 4, 2026

(54) BENCH-TOP LABEL DISPENSER FOR ACOUSTO-MAGNETIC (AM) ANTI-THEFT LABELS

(71) Applicant: NINGBO SIGNATRONIC TECHNOLOGIES, LTD., Ningbo (CN)

(72) Inventors: Caofei Liu, Ningbo (CN); Huiping Hu, Ningbo (CN)

(73) Assignee: NINGBO SIGNATRONIC TECHNOLOGIES, LTD., Ningbo (CN)

( * ) Notice: Subject to any disclaimer, the term of this patent is extended or adjusted under 35 U.S.C. 154(b) by 90 days.

(21) Appl. No.: 18/846,262

(22) PCT Filed: Jul. 15, 2023

(86) PCT No.: PCT/CN2023/107606
§ 371 (c)(1),
(2) Date: Sep. 11, 2024

(87) PCT Pub. No.: WO2024/017174
PCT Pub. Date: Jan. 25, 2024

(65) Prior Publication Data

US 2025/0206488 A1 Jun. 26, 2025

(30) Foreign Application Priority Data

Jul. 20, 2022 (CN) ........................ 202210875115.X

(51) Int. Cl.
*B65C 9/18* (2006.01)
*B65C 9/00* (2006.01)
*B65C 9/42* (2006.01)

(52) U.S. Cl.
CPC .......... *B65C 9/1865* (2013.01); *B65C 9/0006* (2013.01); *B65C 9/42* (2013.01)

(58) Field of Classification Search
CPC ....... B65C 9/1865; B65C 9/0006; B65C 9/42; B65C 11/006
(Continued)

(56) References Cited

U.S. PATENT DOCUMENTS 9,199,758 B1 12/2015 Chen
11,708,187 B1 * 7/2023 Simiriglio ............ B65C 9/1892 156/541

FOREIGN PATENT DOCUMENTS

CN 218617613 U 3/2023

OTHER PUBLICATIONS

International Search Report of PCT Patent Application No. PCT/CN2023/107606 issued on Oct. 11, 2023.

* cited by examiner

*Primary Examiner* — James D Sells

(57) ABSTRACT

The present disclosure provides a bench-top label dispenser for acousto-magnetic (AM) anti-theft labels. The bench-top label dispenser includes a housing, and a feeding mechanism, a guide mechanism, a tension traction mechanism, and a control mechanism that are arranged on the housing, where an AM anti-theft label release liner on the feeding mechanism is connected to the tension traction mechanism through the guide mechanism; the tension traction mechanism is controlled by the control mechanism to pull the AM anti-theft label release liner; the housing is provided with a label sensing module electrically connected to the control mechanism; the guide mechanism includes a label peeling plate; and labels located at a tail end of the label peeling plate are within a sensing range of the label sensing module. The present disclosure can effectively improve the efficiency of peeling and labeling, greatly reduce the labor intensity, and reduce the labeling cost.

26 Claims, 9 Drawing Sheets

(58) Field of Classification Search
USPC .......................................................... 156/767
See application file for complete search history.

BENCH-TOP LABEL DISPENSER FOR ACOUSTO-MAGNETIC (AM) ANTI-THEFT LABELS

TECHNICAL FIELD

The present disclosure relates to the technical field of label attachment, and in particular to a bench-top label dispenser for acousto-magnetic (AM) anti-theft labels.

BACKGROUND

With the continuous development of the social economy, a large number of acousto-magnetic (AM) anti-theft labels worldwide need to be attached to merchandise every year. The attachment involves the process of peeling labels, but there is no suitable dispenser for AM anti-theft labels in the market, and the existing peeling process heavily relies on manual peeling of labels from single sheet. The labeling worker needs to peel off the AM anti-theft labels one by one from the AM anti-theft label release liner with both hands or multiple fingers before labeling. The manual operation has high labor intensity, low labeling efficiency, and high labeling cost, severely limiting the large-scale application of the AM anti-theft labels.

SUMMARY

The present disclosure provides a bench-top label dispenser for acousto-magnetic (AM) anti-theft labels. The present disclosure solves the problem that the existing peeling process heavily relies on manual peeling of labels one by one, limiting the large-scale application of the AM anti-theft labels. The present disclosure designs an automatic label dispenser, which effectively improves the efficiency of peeling and labeling, greatly reduces the labor intensity of the labeling worker, and reduces the labeling cost.

In order to solve the above technical problem, the present disclosure provides a bench-top label dispenser for AM anti-theft labels. The bench-top label dispenser includes a housing, and a feeding mechanism, a guide mechanism, a tension traction mechanism, and a control mechanism that are arranged on the housing, where an AM anti-theft label release liner on the feeding mechanism is connected to the tension traction mechanism through the guide mechanism; and the tension traction mechanism is controlled by the control mechanism to pull the AM anti-theft label release liner to move; and the housing is provided with a label sensing module electrically connected to the control mechanism; the guide mechanism includes a label peeling plate; and labels located at a tail end of the label peeling plate are within a sensing range of the label sensing module.

In an embodiment, the tension traction mechanism includes a take-up spool and a rotary drive assembly controlled by the control mechanism; the rotary drive assembly is provided inside the housing; and one end of the take-up spool is connected to a rotating end of the rotary drive assembly.

In an embodiment, the take-up spool is provided with a pressing member for pressing the AM anti-theft label release liner onto the take-up spool.

In an embodiment, the AM anti-theft label release liner between the guide mechanism and the tension traction mechanism is at an angle to the label dispensing plate.

In an embodiment, the guide mechanism further includes a baffle plate and a label pressing plate; the label peeling plate includes one side fixedly connected to the housing and the other side connected to the baffle plate; and the label pressing plate includes a top fixedly connected between the housing and the baffle plate and a bottom butted against the AM anti-theft label release liner located on the label peeling plate.

In an embodiment, the label pressing plate is a soft plate.

In an embodiment, the top of the label pressing plate is close to the feeding mechanism, and the bottom of the label pressing plate is close to the tail end of the label peeling plate; and an angle is formed between the label pressing plate and the label peeling plate.

In an embodiment, the guide mechanism further includes a guide cylinder; one end of the guide cylinder is fixed to the housing; and the AM anti-theft label release liner between the feeding mechanism and the label peeling plate is butted against the guide cylinder.

In an embodiment, the guide cylinder is a permanent magnet cylinder.

In an embodiment, the housing is further provided with a sensor mounting baseplate; and the sensor mounting baseplate is provided with an oblong hole for horizontal movement of the label sensing module.

In an embodiment, a length of the sensor mounting baseplate is less than a length of an end edge of the label peeling plate; and the oblong hole is parallel to the end edge of the label peeling plate.

In an embodiment, a width of the AM anti-theft label on the AM anti-theft label release liner is greater than or equal to a distance between a detection end of the label sensing module and the tail end of the label peeling plate.

In an embodiment, the label sensing module is a photoelectric sensor or a metal sensor.

In an embodiment, the bench-top label dispenser is provided with an AM label resonance detection head with a detection frequency range of 57-59 kHz.

In an embodiment, the bench-top label dispenser is provided with an AM anti-theft label activator; and the AM anti-theft label activator is provided with a movable magnet (for example, in a length direction of the AM anti-theft labels), or an electromagnet, or a permanent magnet that an N-S direction of the permanent magnet is at an angle of 35-55° to a width or movement direction of the AM anti-theft labels.

In an embodiment, the feeding mechanism includes a hanging rod located above the guide mechanism; one end of the hanging rod is fixed to the housing; and the AM anti-theft label release liner, in a roll shape, is supported on the hanging rod.

In an embodiment, the hanging rod is provided with a roll-shaped stopper for restricting the AM anti-theft label release liner in the roll shape to move along the hanging rod.

In an embodiment, the roll-shaped stopper is in the form of a hollow column or a plate structure with a through hole.

In an embodiment, one end of the hanging rod is connected to the housing through an extended fixing member, and the hanging rod is located above a top of the housing.

In an embodiment, the AM anti-theft label release liner is provided with one, two, three or more than three rows of AM anti-theft labels.

In an embodiment, the AM anti-theft label release liner is provided with one, two, three or more than three rows of AM anti-theft labels to form a continuous label sheet or a label roll;

any two adjacent AM anti-theft labels of the continuous label sheet are spaced 0 mm apart, that is, any two adjacent AM anti-theft labels of the continuous label sheet are spaced 0 mm apart in both width and length directions of the AM anti-theft labels; and any two adjacent AM anti-theft labels in each row of the label roll are spaced 1-10 mm apart, that is, any two adjacent AM anti-theft labels in each row of the label roll are spaced 1-10 mm apart in the width direction of the AM anti-theft labels.

In an embodiment, the AM anti-theft labels each have a width of 5-11 mm.

In an embodiment, the AM anti-theft label release liner is provided with multiple tear lines.

In an embodiment, the control mechanism further includes a control panel; and the control panel is provided on the housing.

In an embodiment, the housing is further provided with the AM label resonance detection head with a detection frequency range of 57-59 kHz.

In an embodiment, the housing is further provided with the AM anti-theft label activator. In an embodiment, the AM anti-theft label activator includes a permanent magnet.

In an embodiment, a ratio of a total length of the continuous label sheet or the label roll to the width of a single AM anti-theft label is greater than or equal to 30.

Compared with the prior art, the embodiments of the present disclosure have the following beneficial technical effects. The tension traction mechanism pulls the AM anti-theft label release liner to move smoothly downwards. Whenever the labels on the AM anti-theft label release liner are detected by the label sensing module, the pulling action of the tension traction mechanism is stopped, such that the labels stay at the tail end of the label peeling plate, making it easy for a labeling worker to remove the labels from the tail end of the label peeling plate for labeling. When the label sensing module detects that the labels at the tail end of the label peeling plate are removed, the tension traction mechanism continues to pull the AM anti-theft label release liner to move. When subsequent labels stay within the sensing range of the label sensing module, the tension traction mechanism stops the pulling action. The above peeling operation is repeated. In the present disclosure, there is no need for the labeling worker to peel off the labels with both hands, and the labeling worker can directly remove the labels from the tail end of the label peeling plate. This embodiment effectively improves the efficiency of peeling and labeling, greatly reduces the labor intensity of the labeling worker, and reduces the labeling cost.

Figure 1:
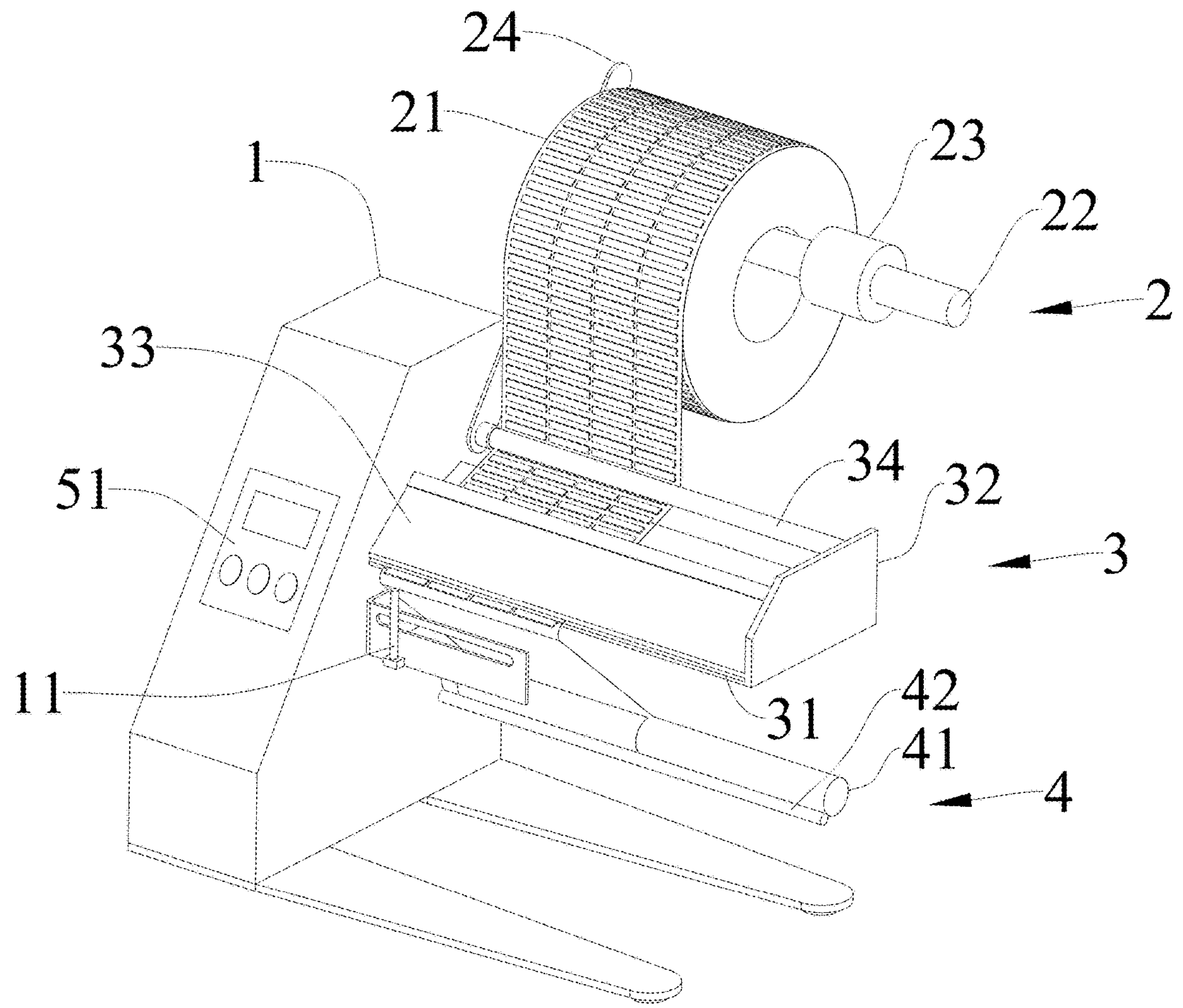
FIG. 1 is a structural diagram of a bench-top label dispenser for acousto-magnetic (AM) anti-theft labels according to an embodiment of the present disclosure.

REFERENCE NUMERALS 1. housing; 11. label sensing module; 12. sensor mounting baseplate; 13. oblong hole; 14. AM label resonance detection head;
2. feeding mechanism; 21. AM anti-theft label release liner; 22. hanging rod; 23. roll-shaped stopper; 24. extended fixing member; 25. AM anti-theft label; 26. tear lines; 27. continuous label sheet; 28. volume label;
3. guide mechanism; 31. label peeling plate; 32. baffle plate; 33. label pressing plate; 34. guide cylinder;
4. tension traction mechanism; 41. take-up spool; 42. pressing member; 43. rotary drive assembly; 44. motor; and 45. gear set;
5. control mechanism; 51. control panel; and
6. AM anti-theft label activator; 61. permanent magnet; 62. support; 63. movable part; and 64. drive mechanism.

DETAILED DESCRIPTION

The technical solutions of the embodiments of the present disclosure are clearly and completely described below with reference to the drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Embodiment 1

Referring to FIGS. 1 to 5 and FIG. 13, Embodiment 1 of the present disclosure provides a bench-top label dispenser, including a housing 1, and a feeding mechanism 2, a guide mechanism 3, a tension traction mechanism 4, and a control mechanism 5 that are arranged on the housing 1. An acousto-magnetic (AM) label release liner 21 on the feeding mechanism 2 is connected to the tension traction mechanism 4 through the guide mechanism 3. The tension traction mechanism 4 is controlled by the control mechanism 5 to pull the AM anti-theft label release liner 21 to move. The housing 1 is provided with a label sensing module 11 that is electrically connected to the control mechanism. The guide mechanism 3 includes a label peeling plate 31. Labels located at a tail end of the label peeling plate 31 are within a sensing range of the label sensing module 11.

A working principle of this embodiment is as follows.

The tension traction mechanism 4 pulls the AM anti-theft label release liner 21 to move smoothly downwards. Whenever the labels on the AM anti-theft label release liner 21 are detected by the label sensing module 11, a signal is issued to stop moving the AM anti-theft label release liner. The pulling action of the tension traction mechanism 4 is stopped, such that the labels stay at the tail end of the label peeling plate 31, making it easy for a labeling worker to remove the labels from the tail end of the label peeling plate 31 for labeling. When the label sensing module 11 detects that the labels at the tail end of the label peeling plate 31 are removed, the tension traction mechanism 4 continues to pull the AM anti-theft label release liner 21 to move. When subsequent labels stay within the sensing range of the label sensing module 11, the tension traction mechanism stops the pulling action. The above peeling operation is repeated.

In this embodiment, there is no need for the labeling worker to peel off the labels with both hands, and the labeling worker can directly remove the labels from the tail end of the label peeling plate 31. This embodiment effectively improves the efficiency of peeling and labeling, greatly reduces the labor intensity of the labeling worker, and reduces the labeling cost.

Further improvements are made to Embodiment 1, as described below according to the drawings.

Embodiment 2

Figure 2:
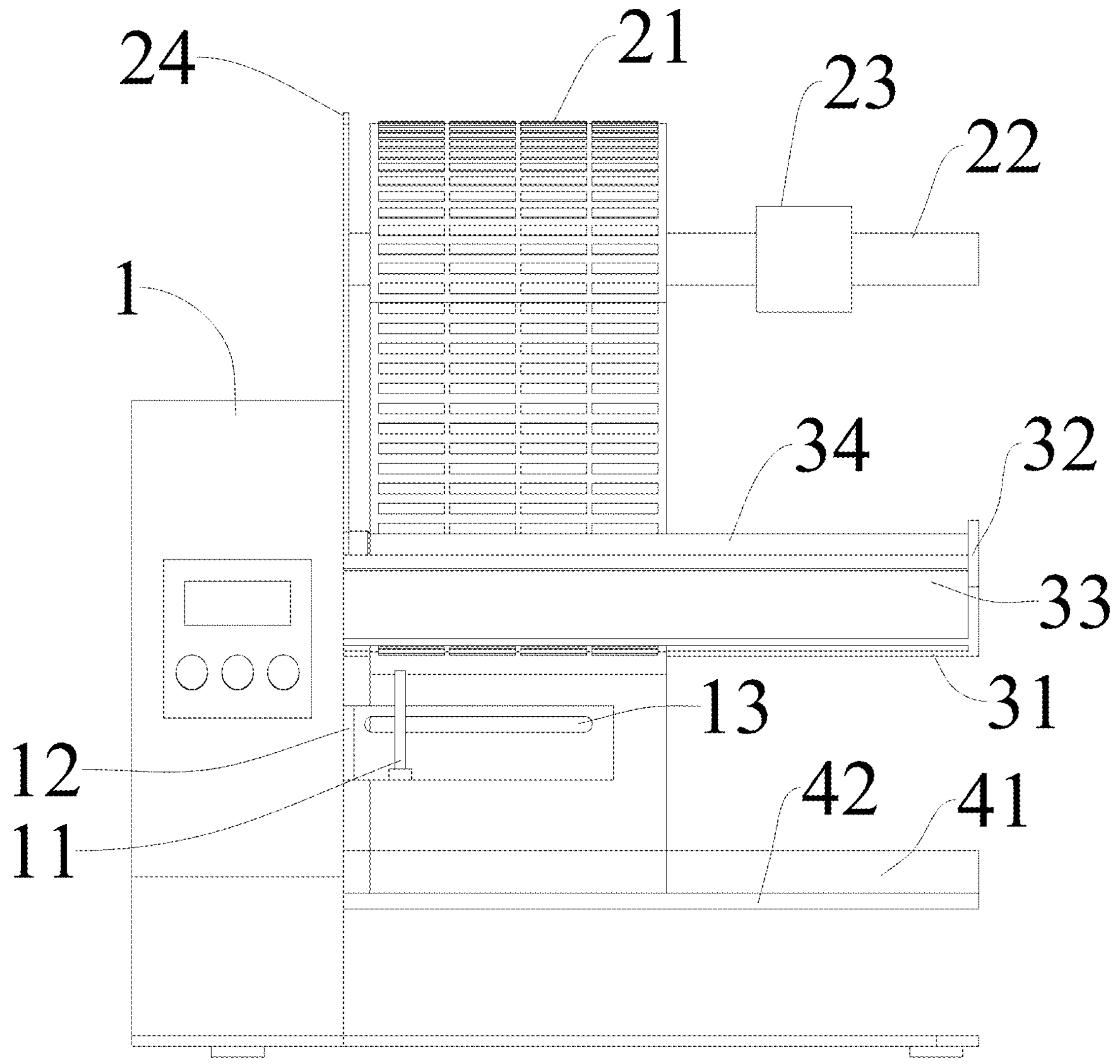
FIG. 2 is a side view of the bench-top label dispenser for AM anti-theft labels according to an embodiment of the present disclosure.
Figure 6:
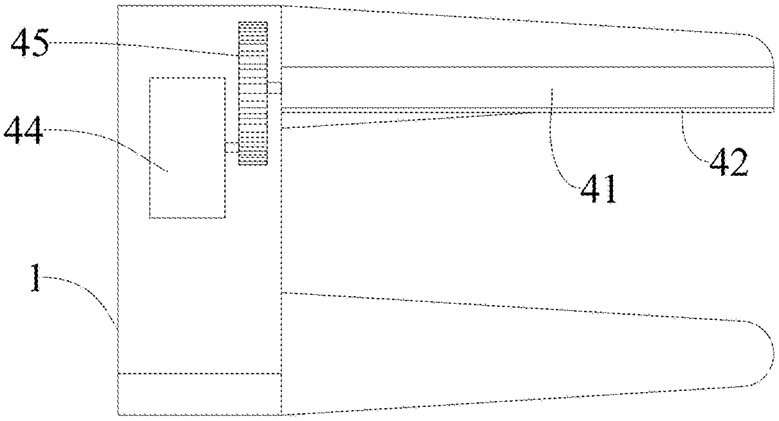
FIG. 6 is a schematic diagram showing a connection relationship between a rotary drive assembly and a take-up spool according to an embodiment of the present disclosure.

Referring to FIGS. 2 and 6, this embodiment improves the tension traction mechanism 4 as follows.

The tension traction mechanism 4 includes a take-up spool 41 and a rotary drive assembly 43 controlled by the control mechanism 5. The rotary drive assembly 43 is provided inside the housing 1, and one end of the take-up spool 41 is connected to a rotating end of the rotary drive assembly 43. In this embodiment, the rotary drive assembly 43 includes a motor 44 and a gear set 45. The motor 44 is controlled by a controller in the control mechanism 5, and is configured to drive the take-up spool 41 to rotate through the gear set 45. A tail end of the AM anti-theft label release liner 21 is wrapped around the take-up spool 41. The take-up spool 41 is rotated to drive the AM anti-theft label release liner 21 to move downwards. The take-up spool 41 is further configured to recover the AM anti-theft label release liner 21. It is understandable that the rotary drive assembly 43 can also drive the take-up spool 41 to rotate relative to the housing 1 through chain transmission or other transmission methods.

Furthermore, the take-up spool 41 is provided with a pressing member 42 for pressing the AM anti-theft label release liner 21 onto the take-up spool 41. The pressing member 42 can be designed as a pressing ring or a pressing rod. The pressing member 42 is provided on the take-up spool 41. As shown in FIG. 1, the pressing rod is configured to press the AM anti-theft label release liner 21 onto the take-up spool 41. In addition, if a U-shaped bent pressing ring is used, the AM anti-theft label release liner 21 can be firmly pressed onto the take-up spool 41.

Figure 12:
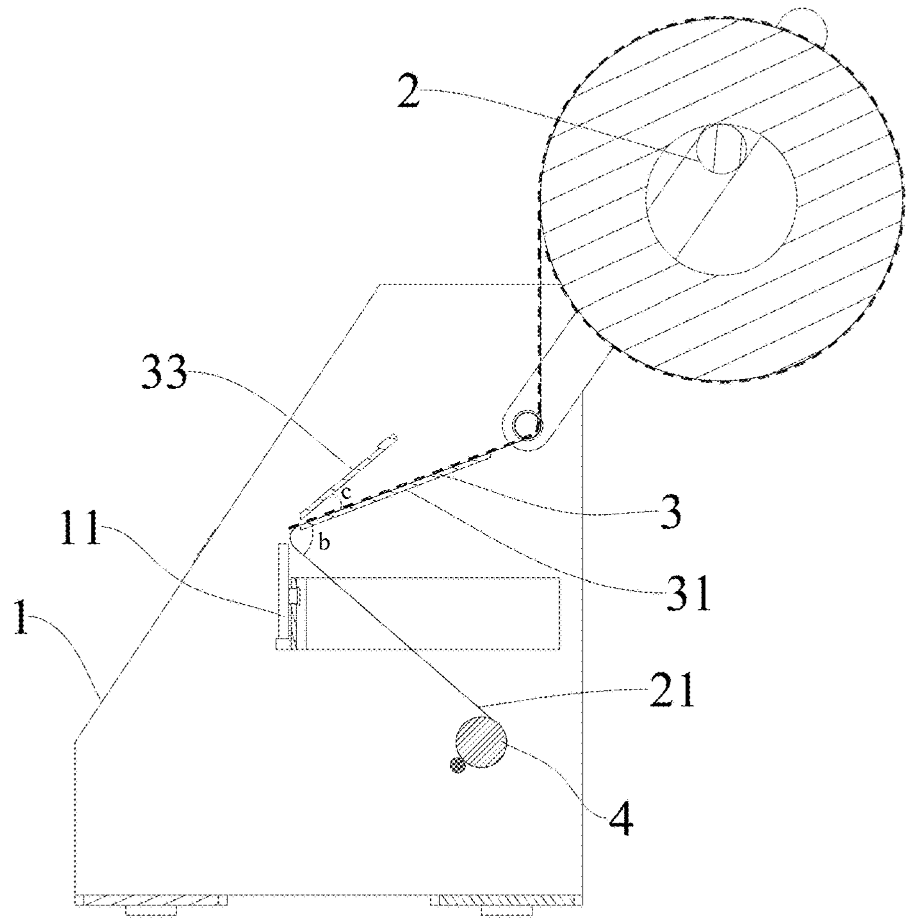
FIG. 12 is a section view of the bench-top label dispenser for AM anti-theft labels according to an embodiment of the present disclosure.
Figure 13:
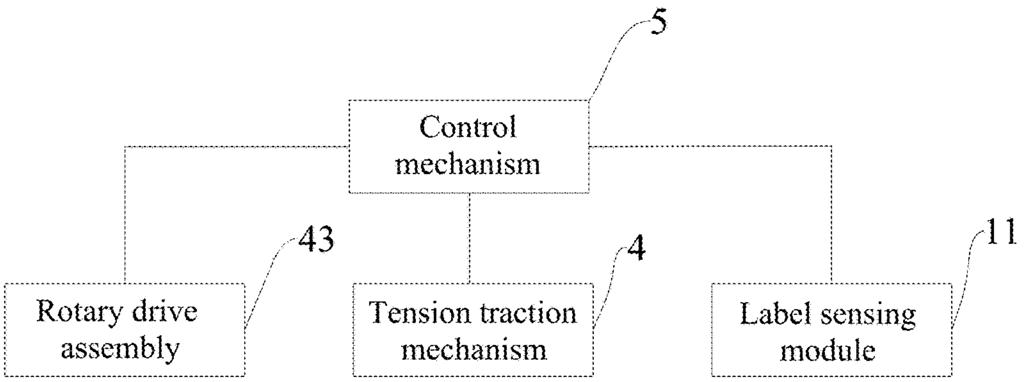
FIG. 13 is a schematic diagram showing a connection relationship between a control mechanism and the rotary drive assembly, as well as a tension traction mechanism, and a label sensing module according to an embodiment of the present disclosure.

Referring to FIG. 12, in this embodiment, in order to facilitate easy labeling by the labeling worker, the AM anti-theft label release liner 21 between the guide mechanism 3 and the tension traction mechanism 4 is at an angle b to the label peeling plate 31. When the tension traction mechanism 4 drives the AM anti-theft label release liner 21 to move and the labels are located at the tail end of the label peeling plate 31, the labels and the AM anti-theft label release liner are in a semi-detached and stationary state. Therefore, there is no need for the labeling worker to peel the labels off with both hands (or multiple fingers), and the labeling worker can easily peel the labels off with just one hand (or one finger). In order to maintain a stable state of the AM anti-theft label release liner 21 during movement for sensing and conveying of the labels, an axis of the take-up spool 41 is parallel to an edge line of the label peeling plate 31.

Embodiment 3

Figure 3:
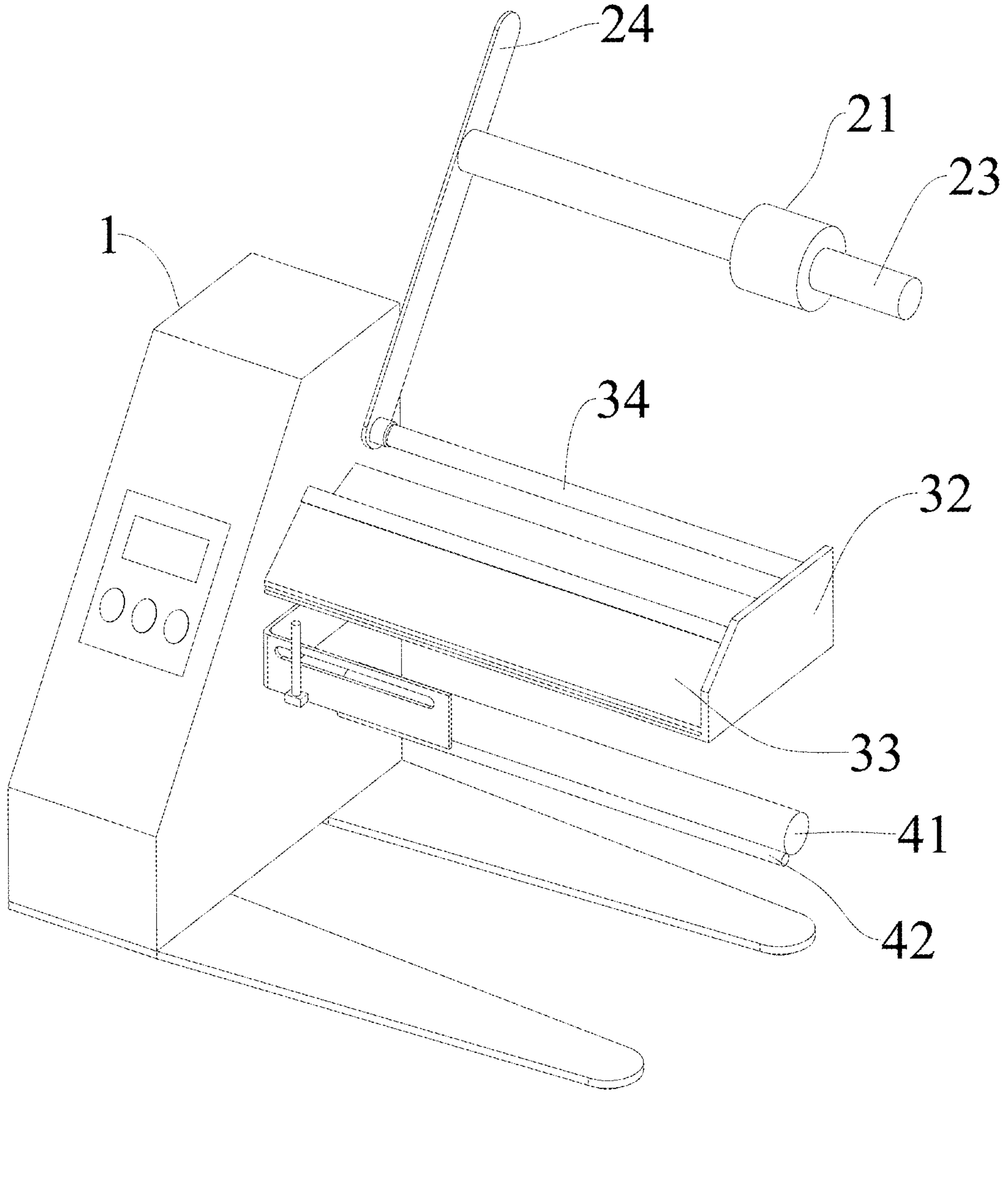
FIG. 3 is a frame diagram of the bench-top label dispenser for AM anti-theft labels according to an embodiment of the present disclosure.

Referring to FIG. 3, this embodiment improves the guide mechanism 3 as follows.

The guide mechanism 3 includes the label peeling plate 31, a baffle plate 32, and a label pressing plate 33. One side of the label peeling plate 31 is fixedly connected to the housing 1, and the other side of the label peeling plate 31 is connected to the baffle plate 32. A top of the label pressing plate 33 is fixedly connected between the housing 1 and the baffle plate 32, and a bottom of the label pressing plate 33 is butted against the AM anti-theft label release liner 21 located on the label peeling plate 31.

In this embodiment, there is a certain distance between the feeding mechanism 2 and the guide mechanism 3, so the AM anti-theft label release liner 21 is in a suspended state. The label pressing plate 33 presses the AM anti-theft label release liner 21 flat onto the label peeling plate 31, in order to convey the AM anti-theft label release liner 21 flat to the tail end of the label peeling plate 31 and wrap it around the take-up spool 41. This can effectively prevent the displacement or bending of the AM anti-theft label release liner 21, making it easy for the labeling worker to quickly and accurately pick up the labels, and also avoiding the bending and damage of the labels on the AM anti-theft label release liner 21.

Preferably, the label pressing plate 33 is a soft plate that can be made of plastic to reduce a travel resistance of the AM anti-theft label release liner 21 on the label peeling plate 31 and to flatten the labels to be removed. In addition, the top of the label pressing plate 33 is close to the feeding mechanism 2, and the bottom of the label pressing plate 33 is close to the tail end of the label peeling plate 31. Referring to FIG. 12, an angle c is formed between the label pressing plate 33 and the label peeling plate 31.

In this embodiment, the guide mechanism 3 further includes a guide cylinder 34. One end of the guide cylinder 34 is fixed to the housing 1. The AM anti-theft label release liner 21 between the feeding mechanism 2 and the label peeling plate 31 is butted against the guide cylinder 34.

Preferably, an AM anti-theft label activator 6 includes a permanent magnet 61.

This embodiment takes into account another issue, namely quality disputes, faced by the labeling worker. During long-distance transportation and storage, the AM anti-theft labels may encounter unforeseen factors such as unexpected mechanical bending or strong magnetic fields after leaving the factory, resulting in the AM anti-theft labels being in a semi-deactivated or almost fully deactivated state.

However, end customers often require each label to be fully active when attached to the product packaging. In addition, most quality disputes arise from transportation and the labeling worker. Before labeling, the labeling worker peels a single label sheet into strips with both hands and peels off the labels one by one from the release liner. The label may be bent and damaged due to strong adhesion. Therefore, it is necessary to reactivate the labels one by one through a magnet at a labeling site, which greatly increases the workload. Therefore, as a further improvement, taking a continuous AM anti-theft label sheet as an example, there are 4 rows of labels. The labels each have a length of 44 mm and a width of 11 mm, and are spaced 0 mm apart in both width and length directions. The label dispenser shown in FIG. 1 is used, which is provided with the AM anti-theft label activator 6. Surfaces of each row of labels are passed through a long permanent magnet cylinder. An axial direction of the long permanent magnet cylinder is in an N-S direction, forming a 35-55° angle with a movement direction of the AM anti-theft label release liner. Alternatively, a long permanent magnet (with a length direction in the N-S direction, which is perpendicular to the direction of the AM anti-theft label release liner) is placed. When the AM anti-theft label release liner stops moving, the permanent magnet moves laterally over a surface of the AM anti-theft label release liner.

Figure 7:
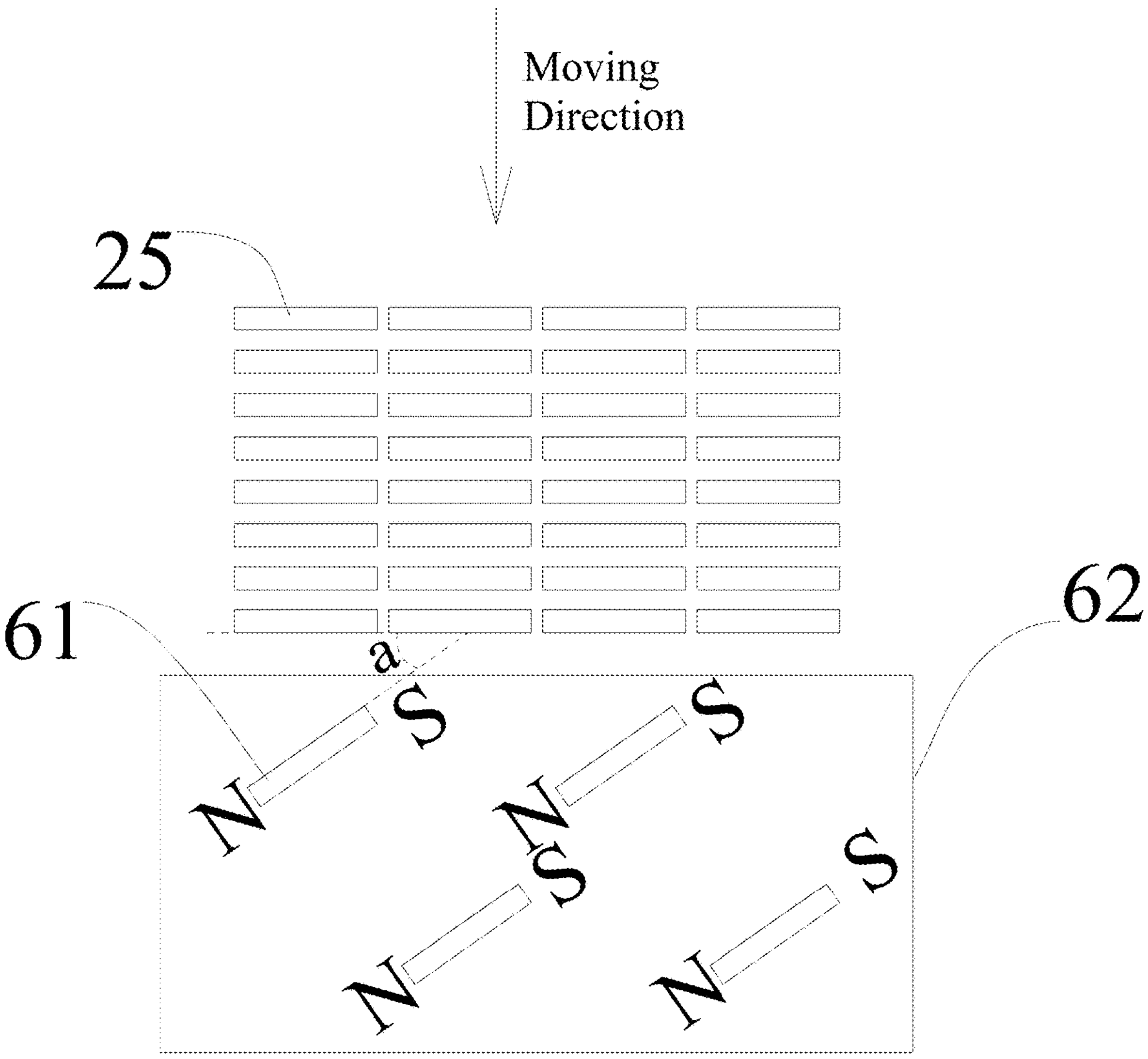
FIG. 7 is a functional diagram of an AM anti-theft label activator according to an embodiment of the present disclosure.
Figure 8:
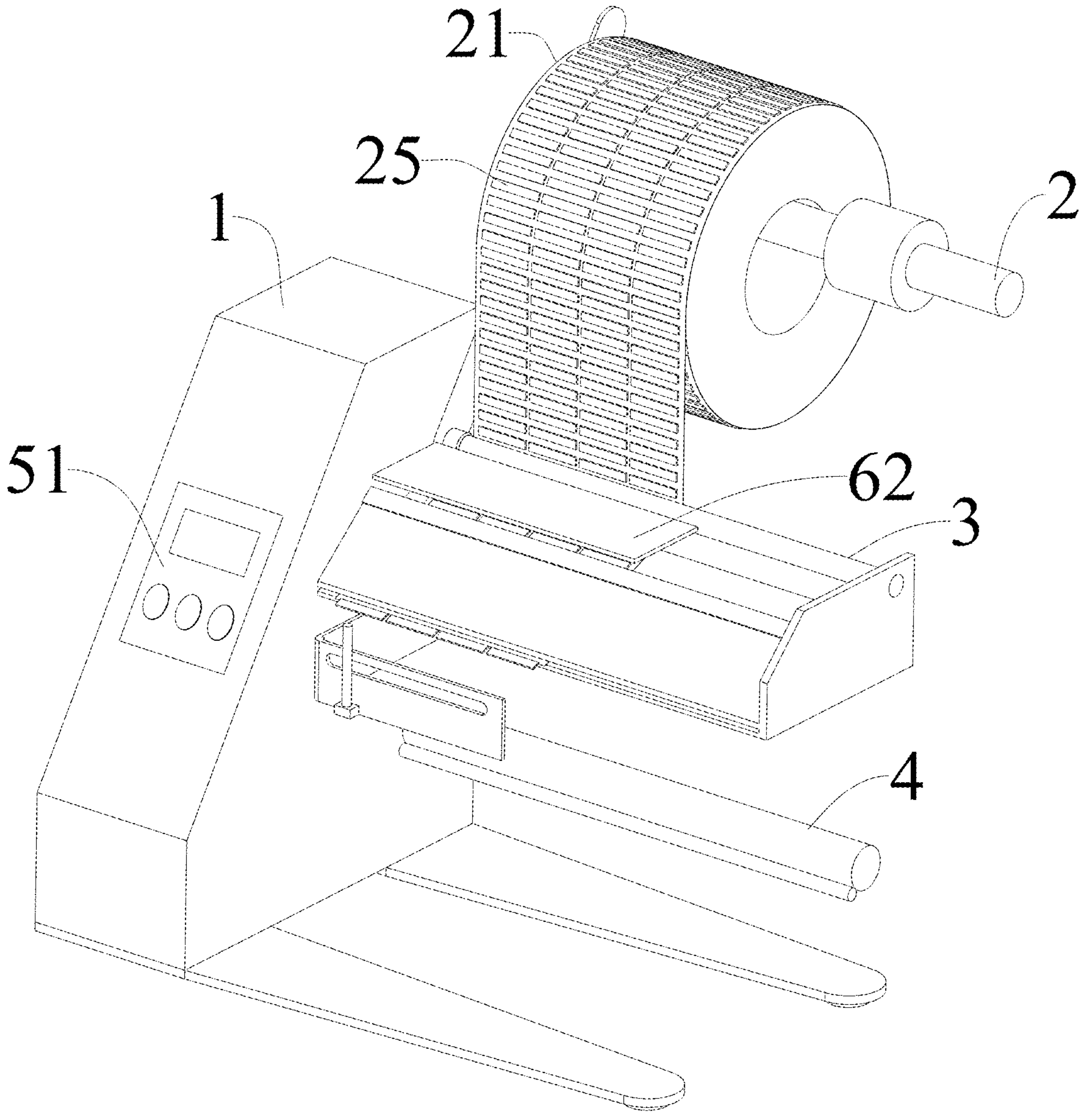
FIG. 8 is a schematic diagram of a support in a mounted state according to an embodiment of the present disclosure.

As shown in FIGS. 7 and 8, in some implementations, an axial direction of the permanent magnet 61 is in the N-S direction. The axial direction of the permanent magnet 61 is at an angle a of 35-55° to the movement direction of the AM anti-theft label release liner 21. The permanent magnet 61 is provided on a support 62, and the support 62 is connected to the housing 1.

Figure 9:
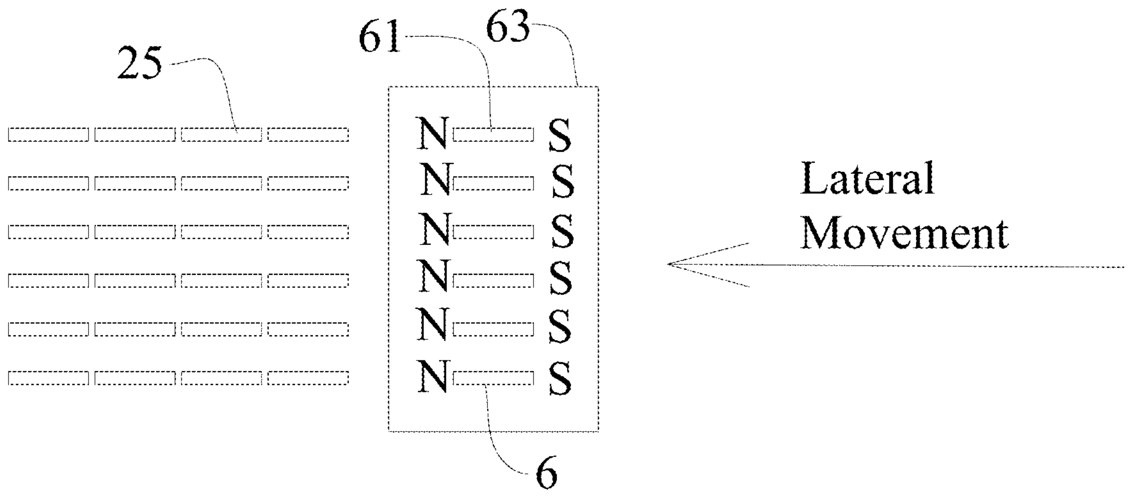
FIG. 9 is a functional diagram of the AM anti-theft label activator according to an embodiment of the present disclosure.
Figure 10:
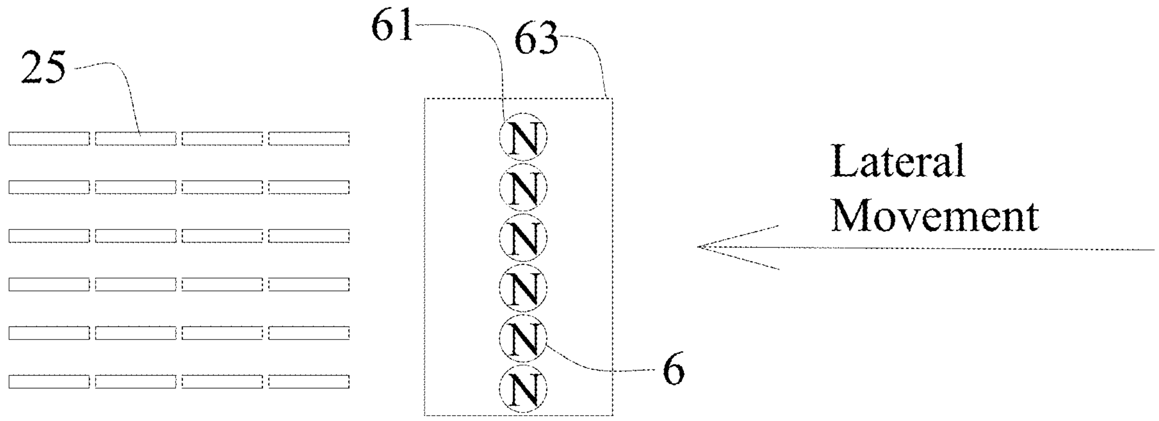
FIG. 10 is a functional diagram of the AM anti-theft label activator according to an embodiment of the present disclosure.
Figure 11:
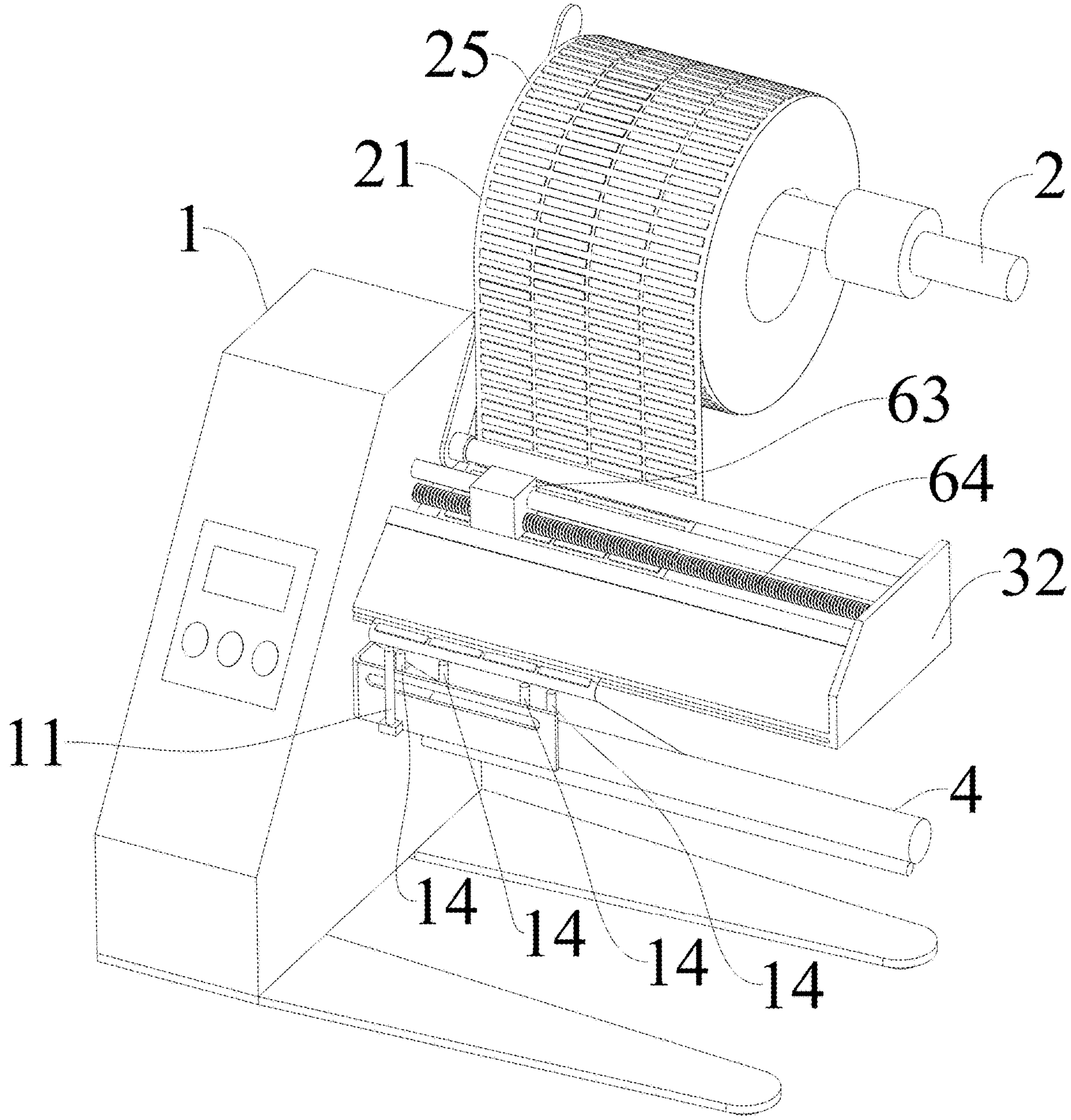
FIG. 11 is a schematic diagram of a movable part in a mounted state according to an embodiment of the present disclosure.

As shown in FIGS. 9 to 11, in some other implementations, the housing 1 is provided with a movable part 63 that is provided with the permanent magnet 61. When the AM anti-theft label release liner 21 stops, a drive mechanism 64 drives the movable part 63, thereby driving the permanent magnet 61 to move laterally. The drive mechanism 64 can be, for example, a lead screw drive mechanism, etc. The length direction of the permanent magnet 61 is in the N-S direction, and is perpendicular to the movement direction of the AM anti-theft label release liner 21. The length direction of the permanent magnet 61 can be parallel to the length direction of an AM anti-theft label 25, as shown in FIG. 9. Alternatively, the length direction of the permanent magnet 61 can be perpendicular to the length direction of the AM anti-theft label 25, as shown in FIG. 10.

Referring to FIG. 1, in an embodiment, the housing 1 is further provided with a sensor mounting baseplate 12. The sensor mounting baseplate 12 is provided with an oblong hole 13 for horizontal movement of the label sensing module 11.

A length of the sensor mounting baseplate 12 is less than a length of an end edge of the label peeling plate 31. The oblong hole 13 is parallel to the end edge of the label peeling plate 31. A width of the AM anti-theft label 25 on the AM anti-theft label release liner 21 is greater than or equal to a distance between a detection end of the label sensing module 11 and the tail end of the label peeling plate 31. It is understandable that the label sensing module 11 is a photoelectric sensor or a metal sensor.

In addition, in practical applications, each label must be detectable when attached to the product packaging, and deactivated labels must not be attached to the product or packaging. Most quality disputes arise from transportation, storage, and labeling operations. Before labeling, the labeling worker peels a single label sheet into strips with both hands and peels off the labels one by one from the AM anti-theft label release liner. The label may be bent and damaged due to strong adhesion. Therefore, the workload of quality assurance, handling of label quality disputes, and strict quality inspection significantly increases. The present disclosure further optimizes the label dispenser. Close-range detection heads are provided for the labeling worker to perform label detection (such as with a detection center frequency of 58 kHz in a detection frequency range of 57-59 kHz) during label pickup, avoiding label quality disputes and simplifying the work and responsibilities of the labeling worker.

As shown in FIG. 11, in this embodiment, the close-range detection heads are AM label resonance detection heads 14. Each AM label resonance detection head 14 corresponds to a row of AM anti-theft labels. As shown in FIG. 11, there are four AM label resonance detection heads 14 corresponding to four rows of AM anti-theft labels, respectively.

A continuous AM anti-theft label sheet includes 6 rows of labels, and the labels each have a length of 45 mm and a width of 5 mm, and are spaced 0 mm apart in both width and length directions. The label dispenser mentioned in Embodiment 1 is used. The label dispenser is provided with a label detection device, with a detection frequency range of 57-59 kHz. When the front-end labels are in a semi-detached and stationary state, the close-range detection head detects whether there is a resonance signal produced by the label. If yes, a light-emitting diode (LED) light is on, indicating that the label is normal and can be peeled off for use. If the LED light is not on, it indicates that the label is abnormal and must be discarded, and then the detection goes for the next label.

Embodiment 4

Referring to FIG. 3, this embodiment improves the feeding mechanism 2 as follows.

The feeding mechanism 2 includes a hanging rod 22 located above the guide mechanism 3. One end of the hanging rod 22 is fixed to the housing 1. The roll-shaped AM anti-theft label release liner 21 is supported on the hanging rod 22. In this embodiment, the hanging rod 22 can be a fixed rod or a rotating shaft driven by a motor, and cooperates with the take-up spool 41 below.

Preferably, the hanging rod 22 is provided with a roll-shaped stopper 23 for restricting the roll-shaped AM anti-theft label release liner 21 to move along the hanging rod 22. The roll-shaped stopper 23 is in the form of a hollow column or a plate structure with a through hole.

In an embodiment, one end of the hanging rod 22 is connected to the housing 1 through an extended fixing member 24, and the hanging rod 22 is located above a top of the housing 1.

Embodiment 5

Referring to FIG. 3, this embodiment improves the feeding mechanism 2 as follows.

In an embodiment, the AM anti-theft label release liner 21 is provided with one, two, three or more than three rows of AM anti-theft labels 25. In an embodiment, the AM anti-theft label release liner 21 is provided with one, two, three or more than three rows of AM anti-theft labels 25 to form a label sheet 27 or label roll 28. Any two adjacent AM anti-theft labels 25 in the continuous label sheet 27 are spaced 0 mm apart, while any two adjacent AM anti-theft labels 25 in each row of the label roll are spaced 1-10 mm apart.

Figure 4:
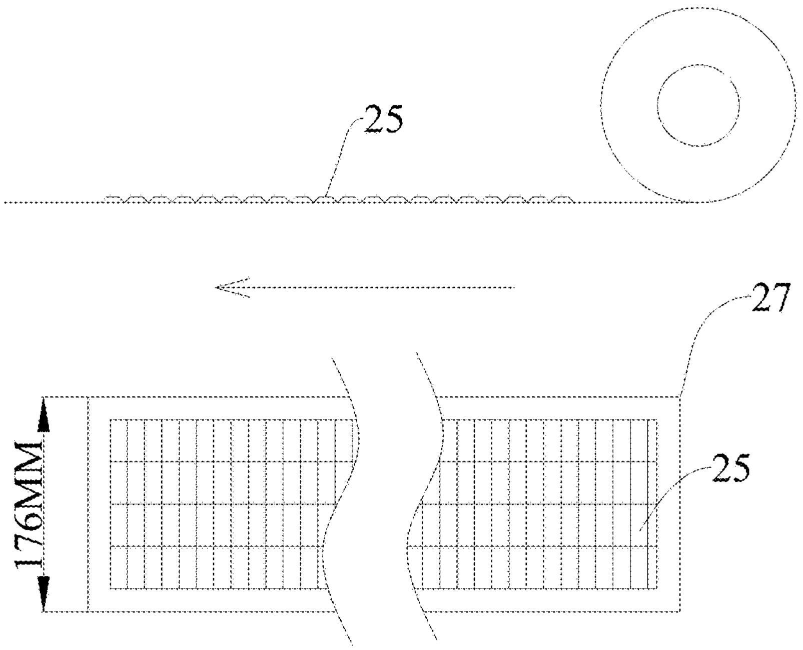
FIG. 4 is a schematic diagram of a continuous label sheet with an AM anti-theft label release liner according to an embodiment of the present disclosure.

As shown in FIG. 4, a continuous AM anti-theft label sheet 27 includes 4 rows of labels, and the labels each have a length of 44 mm and a width of 10 mm, and are spaced 0 mm apart in both width and length directions.

Figure 5:
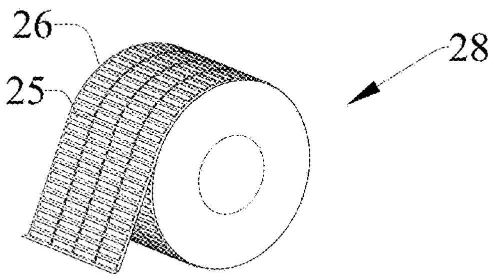
FIG. 5 is a schematic diagram of a label roll with an AM anti-theft label release liner according to an embodiment of the present disclosure.

As shown in FIG. 5, an anti-theft label roll 28 includes 1 row of labels, and the labels each have a length of 45 mm and a width of 7.2 mm, and are spaced 1 mm apart in the width direction and 5 mm in the length direction. The label dispenser shown in FIG. 1 is used.

Alternatively, an anti-theft label roll 28 includes 2 rows of labels, and the labels each have a length of 45 mm and a width of 11 mm, and are spaced 10 mm apart in the width direction and 4 mm apart in the length direction. The label dispenser shown in FIG. 1 is used.

In addition, the AM anti-theft labels 25 each have a width of 5-11 mm.

In addition, the AM anti-theft label release liner 21 is provided with multiple tear lines 26 distributed around the label. When partial labels on the label sheet 27 or label roll 28 are needed, the tear lines 26 are torn to achieve separation.

In an embodiment, a ratio of a total length of the continuous label sheet 27 or the label roll 28 to the width of a single AM anti-theft label 25 is greater than or equal to 30.

In an embodiment, the control mechanism 5 further includes a control panel 51. The control panel 51 is provided on the housing 1. The control panel 51 is provided with a display, buttons, etc., making it convenient for the labeling worker to operate and view the number of labels.

The above described are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A bench-top label dispenser for acousto-magnetic (AM) anti-theft labels, comprising a housing, and a feeding mechanism, a guide mechanism, a tension traction mechanism, and a control mechanism that are arranged on the housing, wherein an AM anti-theft label release liner on the feeding mechanism is connected to the tension traction mechanism through the guide mechanism; and the tension traction mechanism is controlled by the control mechanism to pull the AM anti-theft label release liner to move; and the housing is provided with a label sensing module electrically connected to the control mechanism; the guide mechanism comprises a label peeling plate; and labels located at a tail end of the label peeling plate are within a sensing range of the label sensing module;

wherein the tension traction mechanism is configured to, in response to the label sensing module detecting the labels located at the tail end of the label peeling plate, stop pulling the AM anti-theft label release liner;

wherein the bench-top label dispenser is further provided with an AM anti-theft label activator which comprises a permanent magnet; the housing is provided with a movable part that is provided with the permanent magnet, and in response to that the AM anti-theft label release liner stops, a drive mechanism drives the movable part, thereby driving the permanent magnet to move laterally over a surface of the AM anti-theft label release liner.

2. The bench-top label dispenser according to claim 1, wherein the tension traction mechanism comprises a take-up spool and a rotary drive assembly controlled by the control mechanism; the rotary drive assembly is provided inside the housing; and one end of the take-up spool is connected to a rotating end of the rotary drive assembly.

3. The bench-top label dispenser according to claim 2, wherein the take-up spool is provided with a pressing member for pressing the AM anti-theft label release liner onto the take-up spool.

4. The bench-top label dispenser according to claim 1, wherein the AM anti-theft label release liner between the guide mechanism and the tension traction mechanism is at an angle to the label peeling plate.

5. The bench-top label dispenser according to claim 1, wherein the guide mechanism further comprises a baffle plate and a label pressing plate; the label peeling plate comprises one side fixedly connected to the housing and the other side connected to the baffle plate; and the label pressing plate comprises a top fixedly connected between the housing and the baffle plate and a bottom butted against the AM anti-theft label release liner located on the label peeling plate.

6. The bench-top label dispenser according to claim 5, wherein the label pressing plate is a soft plate.

7. The bench-top label dispenser according to claim 5, wherein the top of the label pressing plate is close to the feeding mechanism, and the bottom of the label pressing plate is close to the tail end of the label peeling plate; and an angle is formed between the label pressing plate and the label peeling plate.

8. The bench-top label dispenser according to claim 1, wherein the guide mechanism further comprises a guide cylinder; one end of the guide cylinder is fixed to the housing; and the AM anti-theft label release liner between the feeding mechanism and the label peeling plate is butted against the guide cylinder.

9. The bench-top label dispenser according to claim 1, wherein the housing is further provided with a sensor mounting baseplate; and the sensor mounting baseplate is provided with an oblong hole for horizontal movement of the label sensing module.

10. The bench-top label dispenser according to claim 9, wherein a length of the sensor mounting baseplate is less than a length of an end edge of the label peeling plate; and the oblong hole is parallel to the end edge of the label peeling plate.

11. The bench-top label dispenser according to claim 1, wherein a width of the AM anti-theft label on the AM anti-theft label release liner is greater than or equal to a distance between a detection end of the label sensing module and the tail end of the label peeling plate.

12. The bench-top label dispenser according to claim 1, wherein the label sensing module is a photoelectric sensor or a metal sensor.

13. The bench-top label dispenser according to claim 1, wherein the feeding mechanism comprises a hanging rod located above the guide mechanism; one end of the hanging rod is fixed to the housing; and the AM anti-theft label release liner, in a roll shape, is supported on the hanging rod.

14. The bench-top label dispenser according to claim 13, wherein the hanging rod is provided with a roll-shaped stopper for restricting the AM anti-theft label release liner in the roll shape to move along the hanging rod.

15. The bench-top label dispenser according to claim 14, wherein the roll-shaped stopper is in the form of a hollow column or a plate structure with a through hole.

16. The bench-top label dispenser according to claim 15, wherein one end of the hanging rod is connected to the housing through an extended fixing member, and the hanging rod is located above a top of the housing.

17. The bench-top label dispenser according to claim 1, wherein the AM anti-theft label release liner is provided with one, two, three or more than three rows of AM anti-theft labels.

18. The bench-top label dispenser according to claim 17, wherein the AM anti-theft label release liner is provided with one, two, three or more than three rows of AM anti-theft labels to form a continuous label sheet or a label roll; and any two adjacent AM anti-theft labels in the continuous label sheet are spaced 0 mm apart, while any two adjacent AM anti-theft labels in each row of the label roll are spaced 1-10 mm apart.

19. The bench-top label dispenser according to claim 1, wherein the AM anti-theft labels each have a width of 5-11 mm.

20. The bench-top label dispenser according to claim 1, wherein the AM anti-theft label release liner is provided with multiple tear lines.

21. The bench-top label dispenser according to claim 1, wherein the control mechanism further comprises a control panel; and the control panel is provided on the housing.

22. The bench-top label dispenser according to claim 1, wherein the housing is further provided with an AM label resonance detection head with a detection frequency range of 57-59 kHz.

23. The bench-top label dispenser according to claim 18, wherein a ratio of a total length of the continuous label sheet or the label roll to a width of a single AM anti-theft label is greater than or equal to 30.

24. The bench-top label dispenser according to claim 6, wherein the top of the label pressing plate is close to the feeding mechanism, and the bottom of the label pressing plate is close to the tail end of the label peeling plate; and an angle is formed between the label pressing plate and the label peeling plate.

25. The bench-top label dispenser according to claim 11, wherein the label sensing module is a photoelectric sensor or a metal sensor.

26. The bench-top label dispenser according to claim 17, wherein the AM anti-theft labels each have a width of 5-11 mm.

* * * * *